United States Patent [19]

Kouth

[11] 4,222,602
[45] Sep. 16, 1980

[54] BLOCKING DEVICE FOR HAND CRANK DRIVES ON AUTOMOBILE SLIDING ROOFS

[75] Inventor: Herbert Kouth, Schoneck, Fed. Rep. of Germany

[73] Assignee: Rockwell-Golde G.m.b.H., Frankfurt am Main, Fed. Rep. of Germany

[21] Appl. No.: 966,175

[22] Filed: Dec. 4, 1978

Related U.S. Application Data

[62] Division of Ser. No. 879,151, Feb. 21, 1978, Pat. No. 4,155,589.

[30] Foreign Application Priority Data

Feb. 21, 1977 [DE] Fed. Rep. of Germany ....... 2707393

[51] Int. Cl.³ .............................................. B60J 7/08
[52] U.S. Cl. ................................. 296/223; 16/110 R; 74/547
[58] Field of Search ...................... 280/137 E, 137 G; 16/110 R

[56] References Cited

U.S. PATENT DOCUMENTS

| | | | |
|---|---|---|---|
| 3,148,913 | 9/1964 | Golde | 296/137 G |
| 4,023,858 | 5/1977 | Bienert | 296/137 G |

*Primary Examiner*—Robert R. Song

[57] ABSTRACT

A blocking device for hand crank drives on automobile sliding roofs, comprising a crank arm, carrying at its end a crank knob and pivotally attached to a rotatable hub plate fixed to the crank pedestal and capable of being folded in over the crank pedestal into a seating slit of the hub plate and locking in a spring-like manner in its two limiting positions. The crank knob of this crank arm, when the crank arm is in its folded-in position, is situated in a pot-shaped depression of a dish, which is non-rotatably fixed concentrically to the crankshaft and surrounds the hub plate, characterised in that a plurality of pot-shaped depressions are disposed at uniform intervals around the circumference of the dish. The walls of these depressions are oriented approximately perpendicularly to the cranking plane.

1 Claim, 10 Drawing Figures

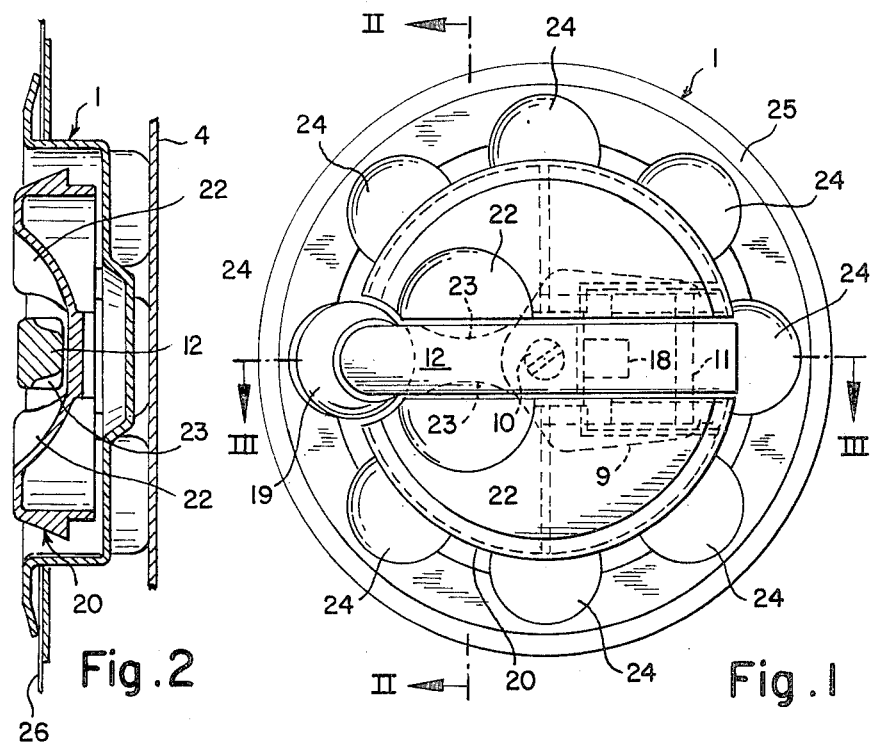
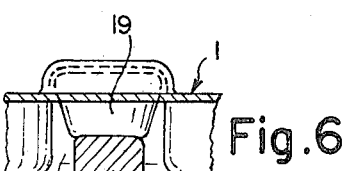
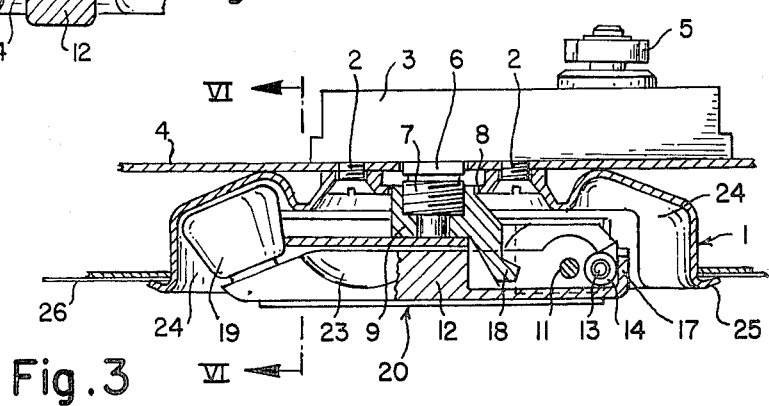

BLOCKING DEVICE FOR HAND CRANK DRIVES ON AUTOMOBILE SLIDING ROOFS

This is a division of application Ser. No 879,151, filed Feb. 21, 1978 now U.S. Pat. No. 4,155,589.

BACKGROUND OF THE INVENTION

This invention relates to a blocking device for hand crank drives on automobile sliding roofs, comprising a crank arm, carrying at its end a crank knob and pivotally attached to a rotatable hub plate fixed to the crank pedestal and capable of being folded back over the crank pedestal into a seating slit of the hub plate and locking in a resilient manner in each of its two limiting positions, the crank knob of this crank arm, in a pot-shaped depression of a dish which is non-rotatably fixed concentrically to the crankshaft and surrounds the hub plate.

In the past, hand crank drives for automobile sliding roofs have not been fitted with a braking device or blocking device, so that under the influence of external forces an undesired sliding of the roof panel in the roof opening can occur, for example under the action of high deceleration forces, such as can easily occur when the brakes are fully applied or in an accident. This means that, when the sliding roof is open, the pushed-back panel is accelerated forwards into its closed position. This leads to a risk of injury for the occupants of the vehicle.

The lack of a blocking or braking device is an especially evident nuisance in so-called sliding and lifting roofs. These are sliding roofs in which the sliding panel can, as desired, either be swung out by raising its rear edge above the roof surface in the manner of front-pivoted ventilator flaps or can be slid beneath the rear, stationary roof surface. When the sliding panel is swung out, forces acting in the vertical direction, such as can occur for instance in travel vibrations, supplemented by the self-weight of the panel can lead to an unintentional lowering of the rear panel edge.

In one known device (DT-AS No. 1, 219, 342) of the initially mentioned category, a rotational locking for the crank arm is indeed to be achieved in the sunken position by the crank knob entering into the pot-shaped depression, but the sunken position is only reached once during each full crank revolution. Each full crank revolution is equivalent, however, to a considerable longitudinal displacement of the panel, for example of the order of 5 cm. The known device is therefore suitable only for pure sliding roofs, but not for sliding and lifting roofs, because a full pivoting out movement of the panel requires, for instance, only three complete crank revolutions. Moreover, in the known device, the effectiveness of the blocking action is at least partly cancelled by the wall regions of the pot-shaped depression being so inclined that, if a reversed driving motion is transmitted through the panel driving system, the crank knob can easily be expelled from the pot-shaped depression due to the sloping walls, so that the desired blocking action is completely lost. This is, moreover, not prevented by the spring-loaded snap device which determines the limiting positions of the crank arm, because this device is not suitable for accepting the forces which occur when such a reversed driving action takes place.

SUMMARY OF THE INVENTION

The task underlying the present invention therefore is to create a blocking device, which permits a finely stepped fixing of the sliding panel over its entire range of movement, which can be used both for sliding roofs and also for sliding and lifting roofs, and in which the hand crank drive is effectively blocked even for high reversed driving forces.

Starting from a blocking device of the initially mentioned category, this task is solved in the invention by the fact that a plurality of pot-shaped depressions are disposed at uniform intervals around the periphery of the dish, the walls of these depressions being approximately perpendicular to the plane of the crank.

With this blocking device, the crank knob can be inserted into a pot-shaped depression in many angular positions of the crank arm, so that very small displacements and pivoting movements of the panel can be achieved. Depending upon the diameter of the dish and the number of pot-shaped depressions dependent thereon, it is possible for an opening adjustment of the panel of about 4 to 5 mm to be accurately observed from one stop location to the next, that is from depression to depression. This fineness of adjustment is in particular of importance for the outward pivoting movement of the panel in a sliding-lifting roof. By means of the invention, almost infinitely fine adjustment of the sliding roof is possible, in combination with reliable blocking of the crank arm in every position. The walls of the pot-shaped depressions, being oriented approximately perpendicularly to the cranking plane, prevent the crank knob from coming out of the depressions under the action of the reversed drive forces.

Pursuant to the concept of this invention, the blocked positions of the crank arm and the crank knob do not have the be denoted by pot-shaped depressions. Indeed, the arrangement may be such that, instead of pot-shaped depressions in the dish, a plurality of ribs or the like oriented perpendicularly to the plane of the crank and radially to the crank shaft at uniform angular intervals may be provided, each two adjacent ribs receiving and seating the crank knob between them when the crank arm is folded in.

Within the concept of this invention it is, however, also possible for the arrangement to be such that the dish possesses substantially the form of a regular polygon, the corner-forming walls of which are oriented approximately perpendicularly to the cranking plane and, when the crank arm is folded in, tangentially touch the crank knob on two sides as it is situated in a corner. In this form of embodiment of the invention also, the crank knob is reliably blocked by the walls of the dish bearing against it, in the folded-in positions of the crank arm.

Further features of the invention are explained in more detail below with reference to drawings illustrating examples of embodiment thereof.

DESCRIPTION OF THE DRAWINGS

The drawings show:

FIG. 1 A plan view of a blocking device with the crank arm folded in,

FIG. 2 a section along II—II of FIG. 1,

FIG. 3 a section along III—III of FIG. 1,

DESCRIPTION OF THE INVENTION

Figure 4:
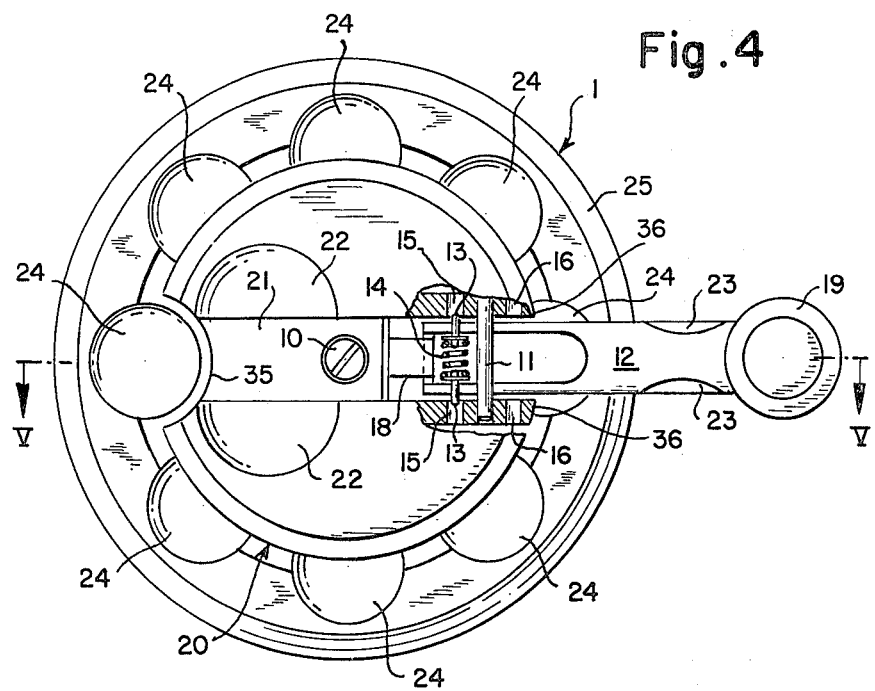
FIG. 4 a plan view of the device similar to FIG. 1, but with the crank arm swung out, FIG. 5 a section along V—V of FIG. 4, FIG. 6 a partly cut away section along VI—VI of FIG. 3, FIG. 7 a plan on another form of embodiment of the blocking device with the hub plate and crank partly cut away, FIG. 8 a section along VIII—VIII of FIG. 7 through the dish only, FIG. 9 a plan on a further form of embodiment of the blocking device with the hub plate and crank arm partly cut away, and FIG. 10 a section along X—X in FIG. 9, through the dish only.
Figure 5:
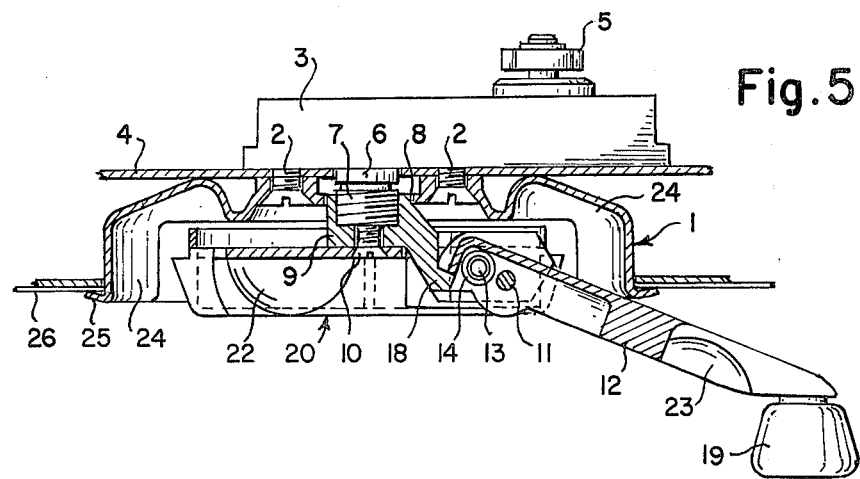

To explain the first form of embodiment, reference is the first made to FIGS. 1 to 6. As can be seen from FIGS. 3 and 5, the dish, generally surrounding the hand crank drive and the blocking device and bearing the general reference 1, is fixed by means of screws 2, together with a gear assembly 3, to a supporting plate 4 lying in a general horizontal plane and forming part of the roof structure, not shown. The supporting plate 4 may, for instance, be formed of the base of the front frame member of the sliding roof frame which usually surrounds the roof opening. In this connection it is important for the purposes of the invention for the gear assembly 3 to be situated above the dish 1, that is to say the position of the gear assembly does not interfere with the form of the dish 1, which is essential for the blocking device.

On its output side, the gear assembly 3 possesses a gear pinion 5, which engages in known manner with forcetransmitting elements of the sliding roof drive, formed in the manner of toothed racks, but flexible. Normally, elastically flexible cables are used as force-transmitting elements, which are furnished with a helical thread for engaging with the gear pinion and are axially slidably guided in a thrust-transmitting manner in guide ducts mounted upon the sliding roof frame.

On its input side, the gear assembly possesses a crankshaft 6, which is furnished with a splined head 7, which extends through a central aperture 8 of the dish 1 into the internal space of the dish. Between the crankshaft 6 and the pinion 5, there is a reduction gear (not shown), which makes possible fine adjustments of the sliding panel, such as are desirable especially for the pivoting-out and in function of sliding and lifting roofs. As explained further on, the possibility of fine adjustment given by the reduction gear can be utilized to the full by the practically infinitely adjustable setting of the blocking device.

The crank pedestal 9 is pushed onto the splined head 7, the pedestal being furnished with a corresponding internal spline, and is secured there by a screw 10. In the example illustrated, the crank pedestal 9 penetrates into the central aperture 8 of the dish 1. The crank pedestal 9 possesses a radially projecting bearing fork, the fork arms 36 of which can be seen in FIG. 4. The foldable crank arm 12 is pivotally journalled on a bearing pin 11, pushed through the fork arms 36 FIGS. 1 and 3 on the one hand and 4 and 5 on the other hand illustrate the two possible limiting positions of the crank arm 12. Both limiting positions are arrested in known manner by detent pins 13, which are slidably mounted in the crank arm 12 and subject to the force of a helical compression spring 14 (FIG. 4). Two pairs of detent bores 15 and 16, disposed in the fork arms 36, are associated with the detent pins 13 for fixing the two aforementioned limiting positions. When the crank arm is swung out into the operating position, the detent pins 13 are situated in the detent bores 15, the crank arm 12 bearing with a stop device 17 against a pivot path-limiting projection 18 of the crank pedestal 9.

In the swung-out position, the crank arm points obliquely downwards, the crank knob 19 rotatably mounted on its one end being so oriented that its axis extends parallel to that of the crankshaft 6. In this position, the crank knob 19 is at a sufficient distance from the underside surfaces of the vehicle roof for the crank to be operated without hindrance.

The hub plate bearing the general reference 20 is fixed to the crank pedestal 9, with advantage by means of the already mentioned screw 10. The seating slit 21, formed in the hub plate 20, is so dimensioned that the folded-in crank arm 12 adopts a sunken position practically flush with the external face of the hub plate (FIGS. 1 to 3). To enable the crank arm 12 to be pivoted out, the hub plate 20 is furnished on each side of the seating slit 21 with finger depressions 22. The same purpose is served by finger grip surfaces 23, formed in the crank arm 12, which are opposite to the finger depressions 22 when the crank arm 12 is folded in.

In the example of embodiment illustrated in FIGS. 1 to 6, eight pot-shaped depressions 24 are disposed at uniform angular intervals around the periphery of the dish 1, all of these depressions being suitable for seating the crank knob 19 in the folded-in position of the crank arm. The internal wall faces of the pot-shaped depressions 24 are approximately perpendicular to the cranking plane, that is to say to the plane defined by the crank knob 19 as the swung-out crank arm 12 is rotated. Each of the pot-shaped depressions 24 therefore encloses a substantially cylindrical space, the axis of which is parallel to the axis of the crankshaft 6. The diameter of this cylindrical space is only slightly greater than the maximum diameter of the crank knob 19, so that, when the crank arm 12 is swung in, this knob is closely surrounded by the wall of the pot-shaped depression 24, into which the crank knob 19 has entered as the crank arm 12 was swung in.

In this manner, assurance is provided that the crank knob 19, when reversed driving forces are introduced via the pinion 5, bears firmly against the inner wall face of the pot-shaped depression, into which it sank as the crank arm was folded in. This leads to a reliable rotational blocking of the folded-in crank arm, so that the sliding roof, even when very large external forces act, remains firmly in its set position.

The large number of pot-shaped depressions provided makes possible a very finely stepped and therefore practically infinitely adjustable setting of the sliding panel. The sliding panel can therefore be finely adjusted, both in its sliding function and also in its pivoting-out function, to suit the vehicle speed, the external weather conditions and the individual requirements of the occupants, a reliable blocking of rotation being attained in each of its possible positions.

The form of the pot-shaped depressions 24 is of decisive importance for the effectiveness of the blocking device. The wall faces of the pot-shaped depressions, associated with the crank knob 19 and oriented perpendicularly to the cranking plane, should be as close as possible to the crank knob and as far as possible encompass it. In order to satisfy this condition, it is of importance for the finger grip on the hand crank drive for pivoting out the crank arm 12 not to be situated in the region of the crank knob 19, but as described in the region of the finger depressions 22 and the finger grip surfaces 23.

As can be seen from FIGS. 1 and 4, the dish 1 has a circular periphery, which is formed of an outwardly bent, peripheral flange rim 25. The flange rim 25 overlaps the roof inner surface 26 surrounding the hand crank drive, so that the dish 1 appears as a depression in the roof surface, which is however practically completely closed by the hub plate 20. The hub plate 20 also bridges over portions of the pot-shaped depressions 24, for which reason the hub plate is also equipped at the outer end of the seating slit 21 with an arc-shaped recess 35, which permits the crank knob 19 to be sunk into the selected pot-shaped depression 24.

Figure 7:
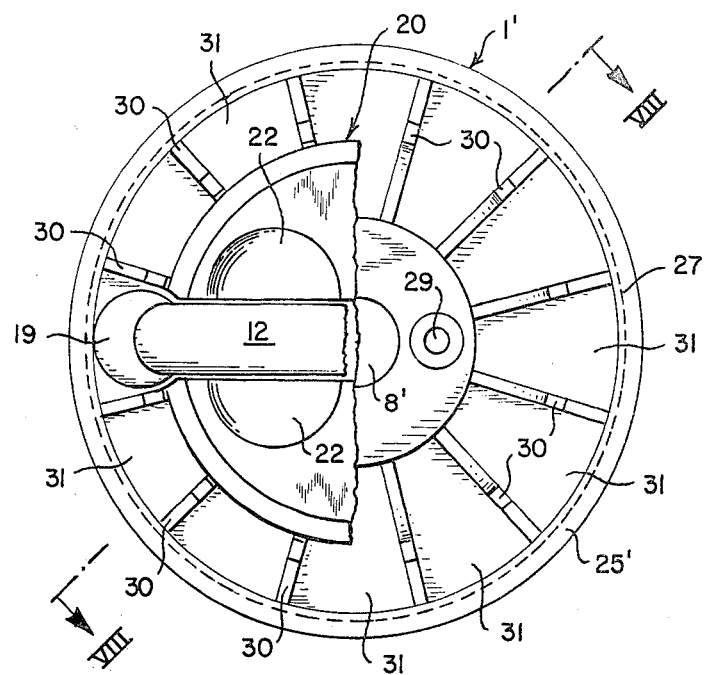
Figure 8:
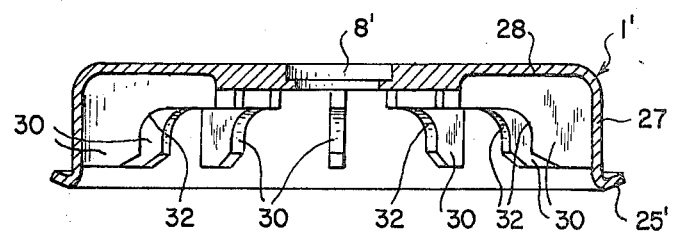

The example of embodiment shown in FIGS. 7 and 8 differs from that of FIGS. 1 to 6 essentially in the form of the dish 1'. The other elements of the blocking device and of the hand crank drive are the same as those already described with reference to FIGS. 1 to 6. In order to illustrate the position of the components visible from outside, only the hub plate 20 and crank arm 12 together with crank knob 19 are shown in FIG. 7 partly cut away. In this example of embodiment, the dish 1' has an approximately cylindrical peripheral wall 27 and a base 28, which is thickened in the vicinity of the central aperture 8' and the fixing bores 29. The base 28 and circumferential wall 27 are adjoined by radially oriented ribs 30, which in co-operation with the circumferential wall 27 each define in pairs a seating space 31 for the crank knob 19. The seating spaces 31 correspond in their function to the pot-shaped depressions 24 of the embodiment according to FIGS. 1 to 6. For this purpose, the ribs 30 are likewise oriented approximately perpendicularly to the cranking plane. In this form of embodiment also, the crank knob, when sunk into a seating space 31 when the crank arm is folded in, ensures that the sliding panel is reliably blocked when external forces occur. Whereas in the example according to FIGS. 1 to 6, eight pot-shaped depressions are provided, the embodiment of the blocking device according to FIGS. 7 and 8, consequent upon the relatively small thickness of the ribs 30, makes possible the provision of a larger number of seating spaces 31, twelve in number in the example of embodiment illustrated. The possibilities of adjustment for the sliding panel are therefore still more finely stepped in this example of embodiment. To enable the hub plate 20 to be housed in the dish 1', the ribs 30 possess identical cut-away portions 32 outside their region affected by the crank knob 19.

Figure 9:
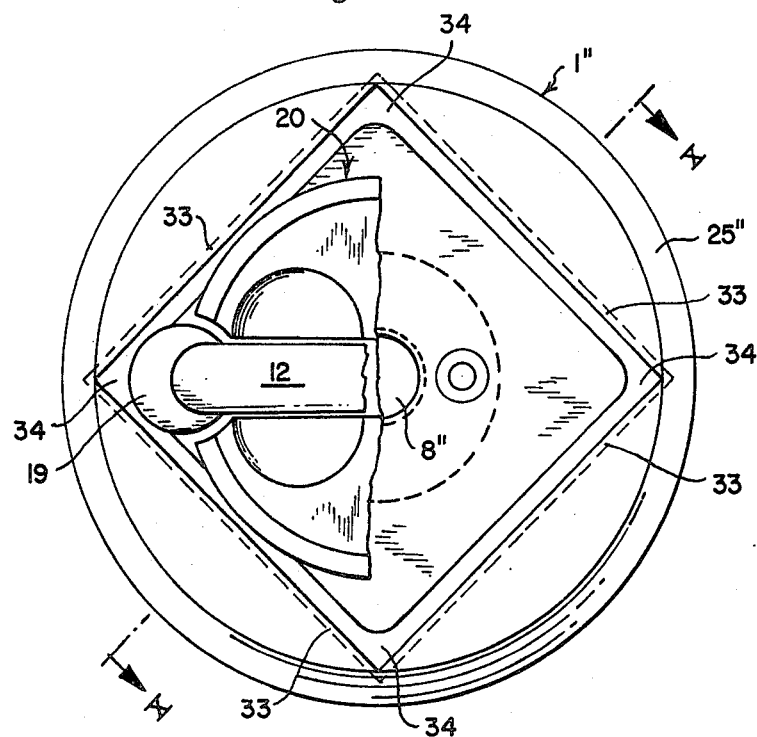
Figure 10:
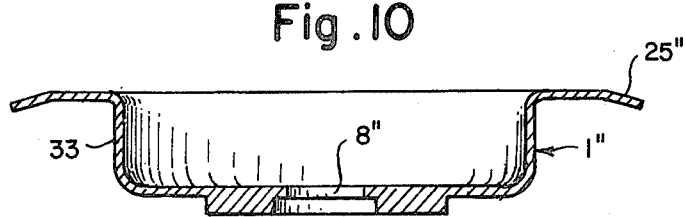

As can be seen from FIGS. 9 and 10, the blocking device can also be constructed without pot-shaped depressions or ribs, by the dish 1" possessing, in its region which is of importance for the functioning of the blocking device, the form of a regular polygon, in the example illustrated that of a square. Here, the deepened region of the dish 1", intended for seating the hub plate, again shown cut away in FIG. 9, has a square cross-section. The peripheral wall 33 of the deepened portion is, in this embodiment also, oriented approximately perpendicularly to the cranking plane. When the dish is of square shape, a seating space 34 for the crank knob 19 is formed in each of the four corners, the corner-forming regions of the peripheral wall 33 touching the inserted crank knob tangentially on two sides. Here again, an effective rotational blocking, when the crank arm 12 is folded in, is ensured. It is of course also possible for regular polygons to be used for forming the shell 1", which have a higher number of corners and therefore permit a finer stepping of the adjustment of the sliding pane. The flange rim 25" of the dish 1" can also be of circular shape as shown, like the flange rims 25 in the example of embodiment of FIGS. 1 to 6 and flange rim 25' in the example according to FIGS. 7 and 8. The flange rim 25" can, however, also be polygonal, for example square, following the edge pattern of the polygonal depression.

In all the examples of embodiment explained, the dish can easily be injection moulded from a suitable plastics material, which retains its form even under high mechanical loading. This is also true for the other parts of the device, for example for the hub plate 20 and crank arm 12.

What is claimed is:

1. A blocking device for hand crank drives on automobile sliding roofs comprising: a crank arm, carrying at its end a crank knob and pivotally attached to a rotatable hub plate fixed to the crank pedestal and capable of being folded in over said crank pedestal into a seating slit of said hub plate and locking in a spring-like manner in its two limiting positions, said crank knob of said crank arm, when said crank arm is in its folded-in position, being situated in a depression of a dish, which is non-rotatably fixed concentrically to the crankshaft and surrounds said hub plate, having a plurality of depressions disposed at uniform intervals around the circumference of said dish, the walls of said depressions being oriented approximately perpendicularly to the cranking plane, wherein said dish has substantially the form of a regular polygon, the corner-forming walls of which are oriented approximately perpendicularly to said cranking plane and, in the folded-in position of said crank arm, touch said crank knob at two sides as it is situated in a corner.

* * * * *